Feb. 8, 1955   W. R. TIMS   2,701,818
FLUID COOLED ELECTRICAL CONDUCTOR WITH FLEXIBLE STIFFENER
Filed Dec. 28, 1951                                    2 Sheets-Sheet 2

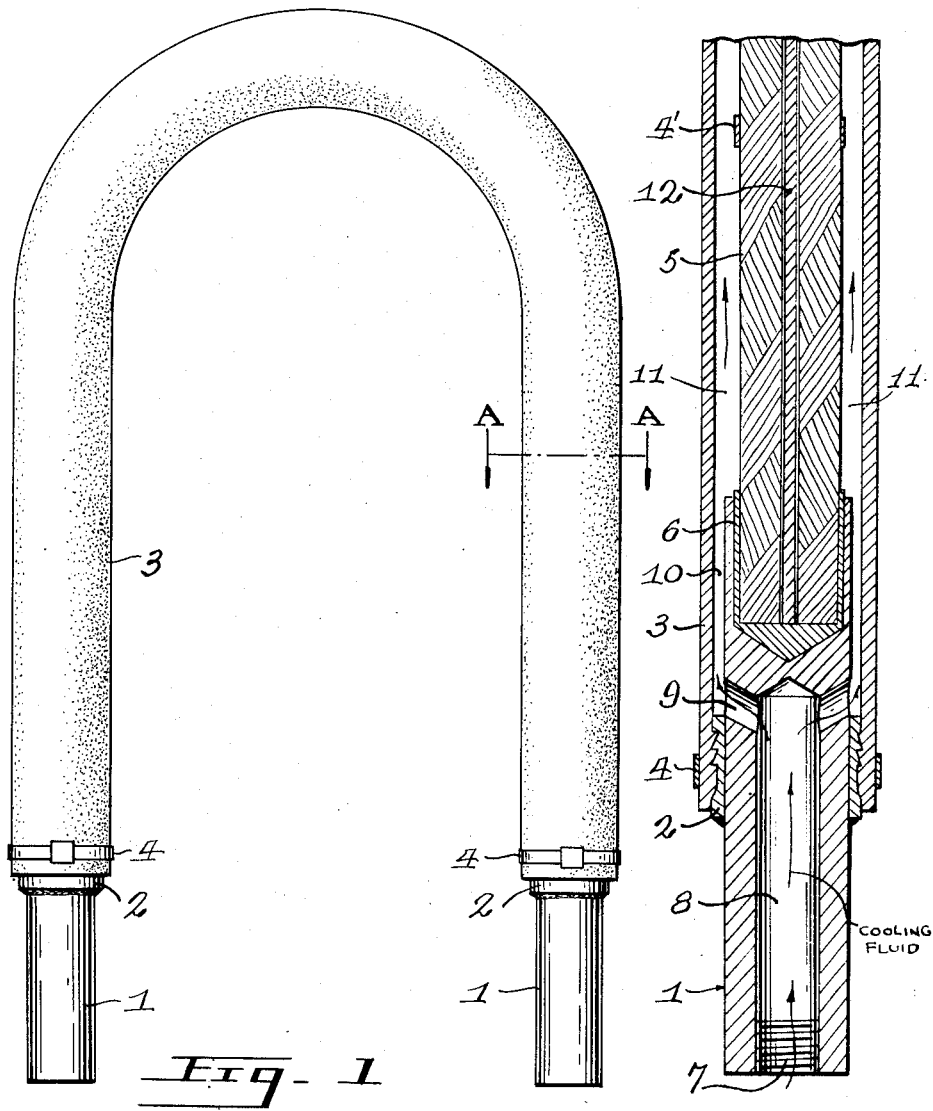

Inventor
Walter R. Tims
By Robert B. Harmon
Attorney

2,701,818

FLUID COOLED ELECTRICAL CONDUCTOR WITH FLEXIBLE STIFFENER

Walter R. Tims, Valois, Quebec, Canada, assignor to Northern Electric Company, Limited, Montreal, Quebec, Canada, a corporation of Canada Application December 28, 1951, Serial No. 263,843

6 Claims. (Cl. 174—28)

This invention relates to electrical conductor cables, and more particularly to self-supported electrical conductor cables for carrying unusually heavy currents.

There are various applications in industry for relatively enormous concentrations of energy, for example, in the operation of electric furnaces of various types and in electric welding apparatus, which require to be supplied with electric current of relatively enormous amperage and ordinarily, though not always, of relatively low voltage.

A high degree of flexibility is a characteristic of great advantage in many instances, particularly, for example, to supply current to any apparatus or machine having an adjustable or otherwise movable element to which one terminal of the supply cable is to be attached to be movable therewith and thus flex the cable. However, there may also be instances in which an advantage may arise from having a cable of this type maintained in other than a straight form. Thus where a welding machine or other apparatus having fixed position contact members is to be connected to bus bars or the like by a heavy duty connecting cable, it may be desired, for reasons of space, safety, ease of inspection, or the like to have the cable span from the bus bar to the machine in a self-supporting, upstanding arch.

An object of the present invention is to provide an electric conductor cable which shall have an improved means of self-support.

Another object of the invention is to keep the weight of the supporting members for the cable at a minimum.

Another object of the invention is that the retardation to the flow of the cooling fluid be kept at a minimum.

A still further object is to maintain the conductivity of the cable at a high level by having the supporting member made of a conductive material.

The applicant obtains these objects in the preferred form by providing a cable of the type disclosed in Canadian Patent No. 441,734 to C. T. Ball and Albert Orwell, May 27, 1947, which may have a multi-unit core such as disclosed in United States Patent No. 1,904,162 to H. Milliken, April 18, 1933, with a supporting member in ribbon or strip form disposed at the center of the core and extending in longitudinal juxtaposition of the cable, the dimensions of the supporting member being such that the cable can be flexed in one direction while being retarded from flexing in a plane at a right angle thereto.

Other objects and features of the invention will appear from the following detailed description of an embodiment thereof, taken in connection with the accompanying drawings in which the same reference numerals are applied to identical parts in the several figures and in which:

Fig. 1 is a diagrammatic view in side elevation of a conductor cable constructed in accordance with the invention and employed to carry current from a bus bar to a contact clamp of a machine;

Fig. 2 is a cross sectional view of the same cable taken longitudinally;

Figure 3:
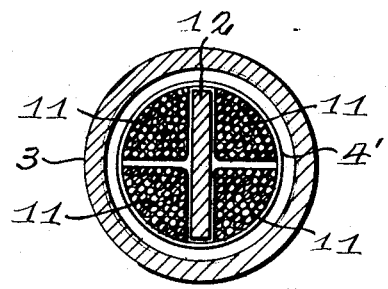
Fig. 3 is a sectional view of the same cable taken on lines AA of Fig. 1.

In Fig. 1 there is shown a cable terminal 1, a sleeve 2, an outer flexible sheath 3 and a clamp 4.

In Fig. 2 there is shown the main conductive body of the cable 5, connected by solder 6 to cable terminal 1. The flexible cable sheath 3 is bound to sleeve 2 and cable terminal 1 by clamps 4. Cable sleeve 2 is also joined to cable terminal 1 by suitable means such as soldering. Fluid connection 7 allows cooling fluid to flow through passages 8 and 9 into space 10 between the conductive body 5 and the cable sheath 3. Except for the conducting body thereof, this cable is similar to the cable disclosed in Canadian Patent No. 441,734.

In order to make this cable self supporting in a form which may be as shown in Fig. 1, in accordance with the present invention the main conducting body may preferably be constructed as shown in Fig. 3. The cable as here shown comprises four segmental conductors 11 each having a plurality of conducting metal strands consisting of small wires intertwisted together and shaped into segments by known means and preferably made of high conductivity material such as pure soft copper or aluminum. These segments are associated together, two on each side of a resiliently flexible flat strip 12 of Phosphor bronze, aluminum, stainless steel or other suitable metallic or non-metallic material. The whole when held together by clamps 4' or other suitable means forms an essentially circular conductor containing within itself a supporting member 12. When constructed in such a way, the cable is flexible in one plane and will maintain itself in an upstanding arch without bending out of a plane at a right angle to the plane in which flexing can occur. By making the strip 12 of a conducting material the conductivity of the cable can be thereby increased. By placing the supporting member at the center of the cable core instead of using extraneous supports, such as members placed in the cooling channels as is sometimes done, retardation to the flow of the cooling medium is kept at a minimum.

Figure 4:
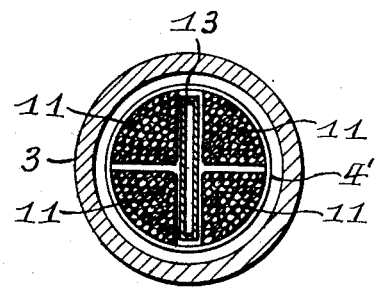
Fig. 4 is a cross sectional view taken on the lines AA showing another embodiment of the invention.

The supporting member may also be constructed with a hollow core 13 as shown in Fig. 4 and connected to passage 8, permitting the cooling fluid to flow also through the center of the supporting member.

Figure 5:
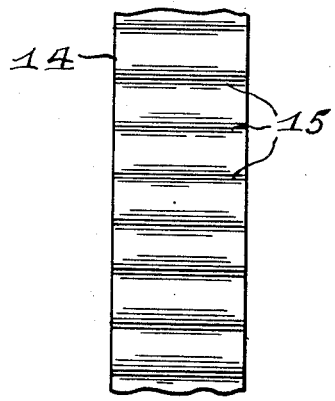
Figs. 5 and 6 show respectively a portion of a front and side elevation of another embodiment of the supporting body for the invention.
Figure 6:
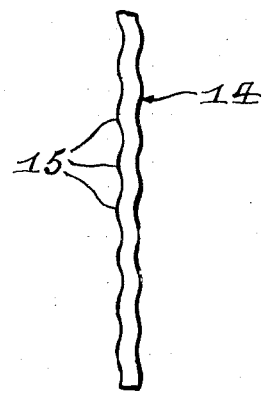

The supporting member, instead of being a resiliently flexible flat strip 12 could be a strip 14 of a conducting material having circumferential corrugations 15 as shown in Figs. 5 and 6, the strip 14 being corrugated in order to increase its strength or to permit its being made from thinner conducting material, and the corrugations 15 being transverse to the longitudinal direction of the cable in order to render the cable more flexible in the plane in which flexing is desired.

In a like manner, the supporting member, instead of being a hollow core tube 13 could be a hollow core corrugated tube.

What is claimed is:

1. A self-supported electric cable capable of conveying a heavy current from an energy source to a heating device and adaptable to be cooled, comprising in combination an elongated flexible conductive body, a flexible sheath concentric therewith and spaced thereapart to provide a space through which a cooling fluid may flow, a supporting body in ribbon form having substantial intrinsic resiliency extending in juxtaposition longitudinally of said conductive body and interposed between the two halves thereof, means for attaching the conductive body to the supporting body whereby the conductive body is supported thereby, said supporting body being transversely rigid so as to maintain the assembled elements in a predetermined longitudinal form whereby said cable is inherently resilient to bending in a predetermined direction and at the same time resistant to bending in a direction at right angles to said predetermined direction.

2. An electric cable in accordance with claim 1 in which the supporting body is made of a conducting material.

3. An electric cable in accordance with claim 1 in which the supporting body is made of a conducting material and having circumferential corrugations to render it flexible in a predetermined plane, the corrugations being transverse to the longitudinal direction of the cable.

4. A self-supported electric cable capable of conveying a heavy current from an energy source to a heating device and adaptable to be cooled, comprising in combination an elongated flexible conductive body, said conductive body being formed of a plurality of core units, a flexible sheath concentric with said conductive body and spaced thereapart to provide a space through which a cooling fluid may flow, a supporting body in ribbon form having intrinsic resiliency extending in juxtaposition longitudinally of said conductive body and interposed at the center of said conductive body, means for attaching the conductive body to the supporting body whereby the conductive body is supported thereby, said supporting body being transversely rigid so as to maintain the assembled elements in a predetermined longitudinal form whereby said cable is inherently resilient to bending in a predetermined direction and at the same time resistant to bending in a direction at right angles to said predetermined direction.

5. A self-supported electric cable comprising an elongated flexible conductive body, said conductive body being formed into a plurality of core units, a flexible sheath concentric with said conductive body and spaced in relation therefrom, a supporting body interposed at the center of said conductive body in juxtaposition longitudinal of the conductive body, means for attaching the conductive body to the supporting body whereby the conductive body is supported thereby, said supporting body being in hollow ribbon form of such dimensions as to permit a cooling fluid to flow through the center, and to permit flexing the cable in one plane while retarding flexing in another plane at a right angle.

6. An electric cable in accordance with claim 5 in which the supporting body is made of conducting material and having circumferential corrugations to render it flexible in a predetermined plane, the corrugations being transverse to the longitudinal direction of the cable.

References Cited in the file of this patent

UNITED STATES PATENTS

| | | |
|---|---|---|
| 592,441 | Patterson | Oct. 26, 1897 |
| 2,483,301 | Roberds | Sept. 27, 1949 |